US012647617B2

(12) United States Patent (10) Patent No.: US 12,647,617 B2
Chen et al. (45) Date of Patent: Jun. 2, 2026

(54) IMAGE DECODING APPARATUS AND METHOD

(71) Applicant: REALTEK SEMICONDUCTOR CORPORATION, Hsinchu (TW)

(72) Inventors: Wu-Jun Chen, Suzhou (CN); Wei Li, Suzhou (CN); Rong Zhang, Suzhou (CN); Wei-Min Zeng, San Jose, CA (US); Chi-Wang Chai, Santa Clara, CA (US)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 18/883,243

(22) Filed: Sep. 12, 2024

(65) Prior Publication Data

US 2026/0075249 A1 Mar. 12, 2026

(51) Int. Cl.
H04N 19/65 (2014.01)
H04N 19/105 (2014.01)
(Continued)

(52) U.S. Cl.
CPC .......... H04N 19/65 (2014.11); H04N 19/105 (2014.11); H04N 19/159 (2014.11);
(Continued)

(58) Field of Classification Search
CPC .... H04N 19/65; H04N 19/105; H04N 19/159; H04N 19/176; H04N 19/52; H04N 19/593; H04N 19/86
(Continued)

(56) References Cited

U.S. PATENT DOCUMENTS 10,116,962 B2 * 10/2018 Kazui .................... H04N 19/70
10,616,576 B2    4/2020 Ameres
(Continued)

FOREIGN PATENT DOCUMENTS

JP         H09182076 A  * 7/1997 ............... H04N 7/32
JP         2003179937 A  * 6/2003 ............... H04N 7/32
JP    WO2009040873 A1 * 1/2011 ........... H04N 19/895

OTHER PUBLICATIONS

OA letter of a counterpart TW application (appl. No. 113136246) mailed on Mar. 27, 2025.
(Continued)

*Primary Examiner* — Behrooz M Senfi
(74) *Attorney, Agent, or Firm* — WPAT, PC

(57) ABSTRACT

The present invention discloses an image decoding method that includes steps outlined below. Error report information related to an error block in an N-th image frame generated according to an inter-frame coding technology is received by an image encoding apparatus at a time spot that the image decoding apparatus receives a corresponding block of an N+P–1-th image frame and an N+P-th image frame is encoded according to an intra-frame coding technology. Blocks in the N-th image frame before the occurrence of the error block are decoded according to the inter-frame coding technology. Motion vector information and residue information are set to be zero to decode the blocks from the error block to the N+P–1-th image frame according to the inter-frame coding technology. The residue information of the intra-frame coding blocks in the N+P-th image frame is retrieved to decode the intra-frame coding blocks according to the intra-frame coding technology.

12 Claims, 4 Drawing Sheets

(51) Int. Cl.

| | | |
|---|---|---|
| *H04N 19/159* | (2014.01) | |
| *H04N 19/176* | (2014.01) | |
| *H04N 19/52* | (2014.01) | |
| *H04N 19/593* | (2014.01) | |
| *H04N 19/86* | (2014.01) | |

(52) U.S. Cl.
CPC ........... *H04N 19/176* (2014.11); *H04N 19/52* (2014.11); *H04N 19/593* (2014.11); *H04N 19/86* (2014.11)

(58) Field of Classification Search
USPC .................................................... 375/240.16
See application file for complete search history.

(56) References Cited

U.S. PATENT DOCUMENTS

| | | | | |
|---|---|---|---|---|
| 12,470,737 | B1 * | 11/2025 | Chang .................... | H04N 19/44 |
| 2013/0058394 | A1 * | 3/2013 | Nilsson ................ | H04N 19/107 |
| | | | | 375/E7.153 |
| 2014/0241433 | A1 * | 8/2014 | Bosse .................. | H04N 19/463 |
| | | | | 375/240.16 |
| 2021/0306639 | A1 * | 9/2021 | Jang .................... | H04N 19/139 |

OTHER PUBLICATIONS

Wen-Nung Lie, and Zhi-Wei Gao, "Video Error Concealment by Integrating Greedy Suboptimization and Kalman Filtering Techniques", IEEE Transactions On Circuits and Systems for Video Technology, vol. 16, No. 8, IEEE, Aug. 2006, p. 982-992.

\* cited by examiner

<u>300</u>

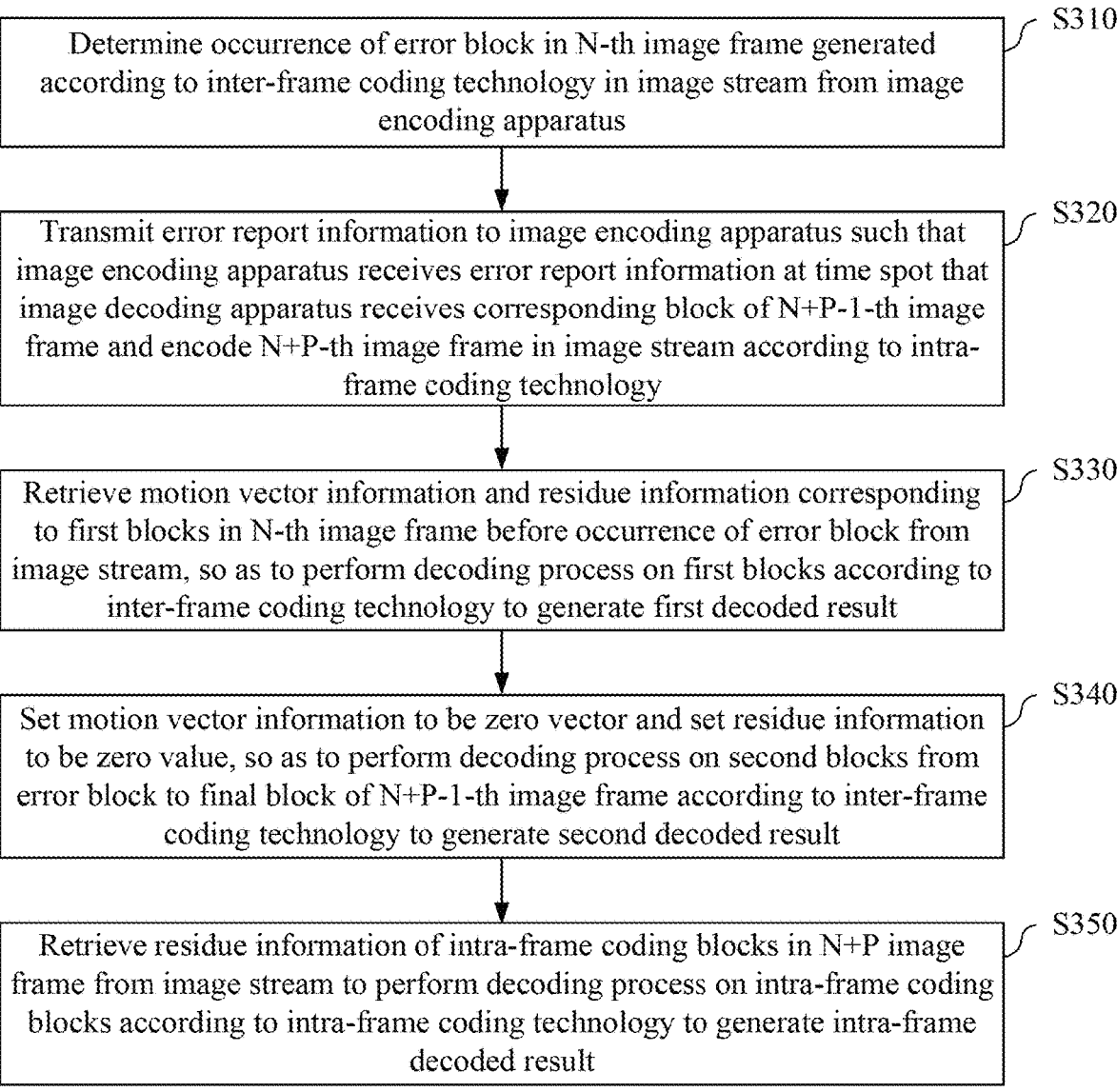

S310
Determine occurrence of error block in N-th image frame generated according to inter-frame coding technology in image stream from image encoding apparatus S320
Transmit error report information to image encoding apparatus such that image encoding apparatus receives error report information at time spot that image decoding apparatus receives corresponding block of N+P-1-th image frame and encode N+P-th image frame in image stream according to intra-frame coding technology S330
Retrieve motion vector information and residue information corresponding to first blocks in N-th image frame before occurrence of error block from image stream, so as to perform decoding process on first blocks according to inter-frame coding technology to generate first decoded result S340
Set motion vector information to be zero vector and set residue information to be zero value, so as to perform decoding process on second blocks from error block to final block of N+P-1-th image frame according to inter-frame coding technology to generate second decoded result S350
Retrieve residue information of intra-frame coding blocks in N+P image frame from image stream to perform decoding process on intra-frame coding blocks according to intra-frame coding technology to generate intra-frame decoded result

Fig. 3

IMAGE DECODING APPARATUS AND METHOD

BACKGROUND OF THE INVENTION

1. Field of the Invention

The present invention relates to an image decoding apparatus and an image decoding method.

2. Description of Related Art

Along with the increase of the demands on multimedia entertainment and higher display quality from the customers, the requirements of the processing, transmission and storage resource of the video contents, e.g., the memory size and the bandwidth, increase as well. Lots of video standards are established to guarantee the display quality of the video contents and make a lot of progress on the compression and decompression efficiency.

However, during the transmission of the image stream, data loss happens. When the data is lost, the image decoding apparatus may not perform decoding correctly according to information, e.g., motion vector information and residue information, transmitted by the image encoding apparatus. If no strategy in response to the data loss is presented, the image decoding apparatus can not perform decoding to generate the correct decoded image frame.

SUMMARY OF THE INVENTION

In consideration of the problem of the prior art, an object of the present invention is to supply an image decoding apparatus and an image decoding method.

The present invention discloses an image decoding method used in an image decoding apparatus that includes steps outlined below. An occurrence of an error block in an N-th image frame generated according to an inter-frame coding technology in an image stream from an image encoding apparatus is determined, wherein N is an integer larger than 1. Error report information is transmitted to the image encoding apparatus such that the image encoding apparatus receives the error report information at a time spot that the image decoding apparatus receives a corresponding block of an N+P−1-th image frame and encodes an N+P-th image frame in the image stream according to an intra-frame coding technology, wherein P is an integer larger than or equal to 1. Motion vector information and residue information corresponding to a plurality of first blocks in the N-th image frame before the occurrence of the error block are retrieved from the image stream, so as to perform a decoding process on the first blocks according to the inter-frame coding technology to generate a first decoded result. The motion vector information is set to be a zero vector and the residue information is set to be a zero value, so as to perform the decoding process on a plurality of second blocks from the error block to a final block of the N+P−1-th image frame according to the inter-frame coding technology to generate a second decoded result. The residue information of a plurality of intra-frame coding blocks in the N+P-th image frame is retrieved from the image stream to perform the decoding process on the intra-frame coding blocks according to the intra-frame coding technology to generate an intra-frame decoded result.

The present invention also discloses an image decoding apparatus that includes a front-end decoding circuit and a back-end decoding circuit. The front-end decoding circuit is configured to determine an occurrence of an error block in an N-th image frame generated according to an inter-frame coding technology in an image stream from an image encoding apparatus, wherein N is an integer larger than 1. The front-end decoding circuit is further configured to transmit error report information to the image encoding apparatus such that the image encoding apparatus receives the error report information at a time spot that the image decoding apparatus receives a corresponding block of an N+P−1-th image frame and encodes an N+P-th image frame in the image stream according to an intra-frame coding technology, wherein P is an integer larger than or equal to 1. The back-end decoding circuit is configured to retrieve motion vector information and residue information corresponding to a plurality of first blocks in the N-th image frame before the occurrence of the error block from the image stream, so as to perform a decoding process on the first blocks according to the inter-frame coding technology to generate a first decoded result. The back-end decoding circuit is also configured to set the motion vector information to be a zero vector and set the residue information to be a zero value, so as to perform the decoding process on a plurality of second blocks from the error block to a final block of the N+P−1-th image frame according to the inter-frame coding technology to generate a second decoded result. The back-end decoding circuit is further configured to retrieve the residue information of a plurality of intra-frame coding blocks in the N+P-th image frame from the image stream through the front-end decoding circuit to perform the decoding process on the intra-frame coding blocks according to the intra-frame coding technology to generate an intra-frame decoded result.

These and other objectives of the present invention will no doubt become obvious to those of ordinary skill in the art behind reading the following detailed description of the preferred embodiments that are illustrated in the various figures and drawings.

BRIEF DESCRIPTION OF THE DRAWINGS

FIG. 3 illustrates a flow chart of an image decoding method according to an embodiment of the present invention.

DETAILED DESCRIPTION OF THE PREFERRED EMBODIMENTS

An aspect of the present invention is to provide an image decoding apparatus and an image decoding method that set motion vector information to be a zero vector and set residue information to be a zero value under the condition that an error block occurs in the N-th image frame, so as to perform decoding on image blocks from the error block to a final block of an N+P−1-th image frame that a corresponding block corresponding to a time spot that the image encoding apparatus receives error report information resides, and further perform decoding on intra-frame coding blocks of an N+P-th image frame according to an intra-frame coding technology. Such a technology allows the proceeding of the decoding process without referring to the image data having errors and increases the validity of the decoded image frame.

Figure 1:
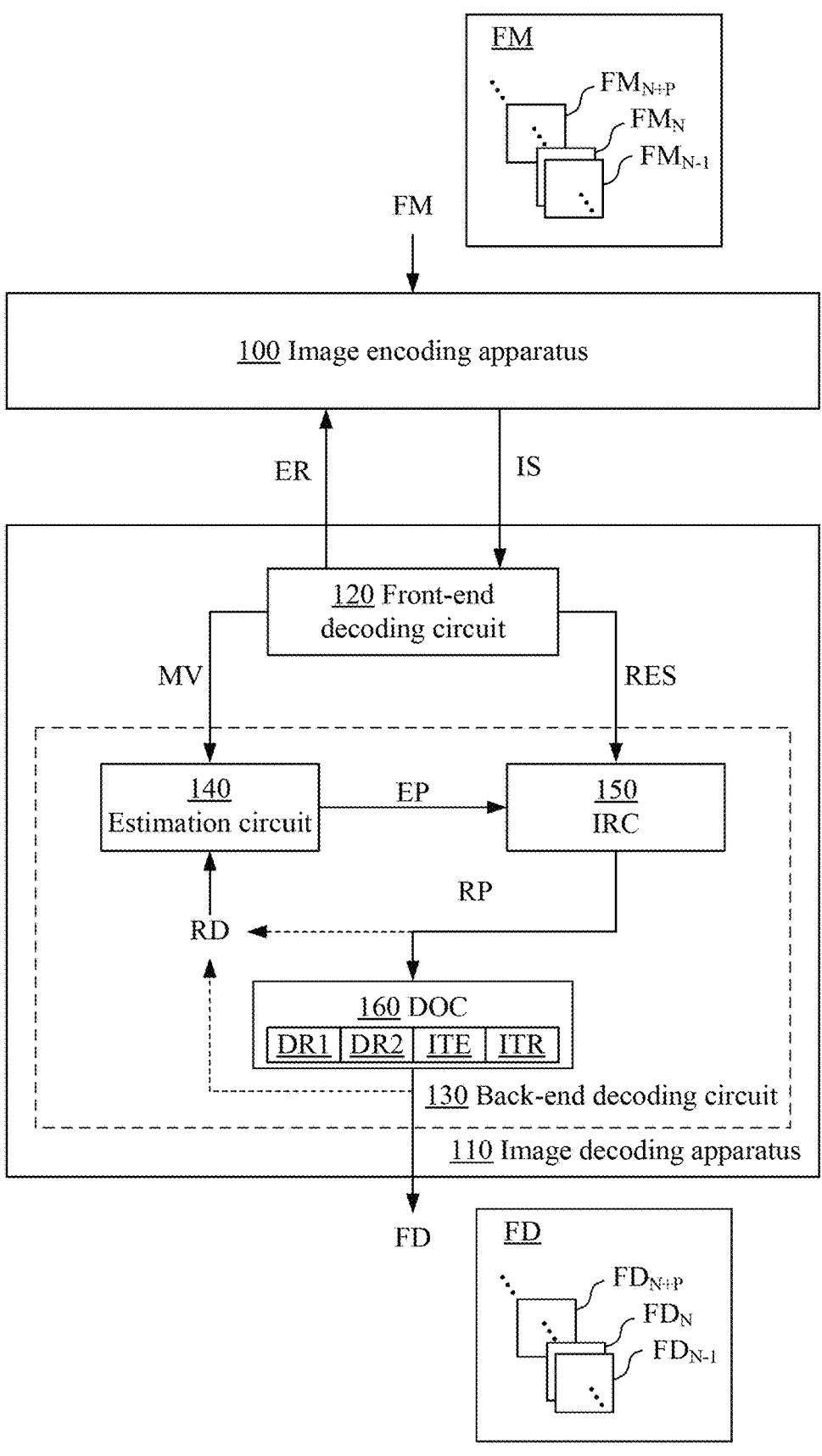
FIG. 1 illustrates a block diagram of an image encoding apparatus and an image decoding apparatus according to an embodiment of the present invention.

Reference is now made to FIG. 1. FIG. 1 illustrates a block diagram of an image encoding apparatus 100 and an image decoding apparatus 110 according to an embodiment of the present invention.

The image encoding apparatus 100 is configured to perform encoding on a plurality of image frames FM, e.g., an N−1-th image frame $FM_{N-1}$, an N-th image frame $FM_N$, . . . and an N+P-th image frame $FM_{N+P}$ exemplarily illustrated in FIG. 1, according to an inter-frame coding technology to generate an image stream IS. N is an integer larger than 1, and P is an integer larger than or equal to 1.

More specifically, take the condition that the N-th image frame $FM_N$ serves as an image frame to be encoded as an example, the image encoding apparatus 100 performs encoding according to corresponding reference image data. The image encoding apparatus 100 may use at least one previous image frame previous to the N-th image frame $FM_N$ as the reference image data according to the inter-frame coding technology. For example, if a single previous image frame neighboring to the current image frame to be encoded is used as the reference image data, the image encoding apparatus 100 uses the N−1-th image frame $FM_{N-1}$ as the reference image data to encode the N-th image frame $FM_N$. However, in other embodiments, the image encoding apparatus 100 may use a single image frame (not illustrated in the figure) ahead of the N-th image frame $FM_N$ by K image frames as the reference image data, or use a plurality of image frames previous to the N-th image frame $FM_N$ as the reference image data. The present invention is not limited thereto.

On the other hand, the image encoding apparatus 100 may use the image content of the N-th image frame $FM_N$ itself as the reference image data to encode the N-th image frame $FM_N$ according to the intra-frame coding technology.

Corresponding to the inter-frame coding technology, the image encoding apparatus 100 performs motion compensation according to motion vector information from the image frame to the reference image data to generate residue information. The processing of such as, but not limited to discrete cosine transform (DCT), quantization and entropy coding is performed subsequently to generate the image stream IS.

On the other hand, corresponding to the intra-frame coding technology, the image encoding apparatus 100 performs processing of such as, but not limited to discrete cosine transform, quantization and entropy coding on the current image frame to generate the image stream IS.

The image decoding apparatus 110 is configured to receive and perform decoding on the image stream IS to generate decoded image frames FD, e.g., an N−1-th image frame $FD_{N-1}$, an N-th decoded image frame $FD_N$, . . . and an N+P-th decoded image frame $FD_{N+P}$ exemplarily illustrated in FIG. 1. The image decoding apparatus 110 includes a front-end decoding circuit 120 and a back-end decoding circuit 130.

The front-end decoding circuit 120 is configured to perform processing of such as, but not limited to entropy decoding, inverse quantization (IQ) and inverse transform (IT) on the image stream IS to retrieve motion vector information MV and residue information RES corresponding to different image frames.

The back-end decoding circuit 130 is configured to perform a decoding process. In an embodiment, the back-end decoding circuit 130 includes an estimation circuit 140, an image reconstruction circuit 150 (abbreviated as IRC in FIG. 1) and a deblock operation circuit 160 (abbreviated as DOC in FIG. 1).

Corresponding to the inter-frame coding technology, the estimation circuit 140 performs calculation according to reference image data RD and the motion vector information MV in the decoding process according to the inter-frame coding technology to generate a plurality of estimated pixels EP. The image reconstruction circuit 150 performs calculation according to the estimated pixels EP and the residue information RES in the decoding process to generate a plurality of reconstructed pixels RP. The deblock operation circuit 160 perform deblock operation according to the reconstructed pixels RP in the decoding process to generate the decoded result and further output the decoded image frames FD according to the decoded result. The decoded image frames FD can be fed to the estimation circuit 140 as the reference image data RD.

Corresponding to the intra-frame coding technology, no motion compensation is required. As a result, the front-end decoding circuit 120 does not retrieve the corresponding motion vector information MV and only retrieves the corresponding residue information RES. The estimation circuit 140 performs calculation according to the reference image data RD from the decoded part within the same image frame in the decoding process according to the intra-frame coding technology to generate the estimated pixels EP. The image reconstruction circuit 150 performs calculation according to the estimated pixels EP and the residue information RES in the decoding process to generate the reconstructed pixels RP. The reconstructed pixels RP may serve as the decoded part within the same image frame described above and be fed to the estimation circuit 140 as the reference image data RD. The deblock operation circuit 160 performs deblock operation according to the reconstructed pixels RP in the decoding process to generate the decoded result further output the decoded image frames FD according to the decoded result.

In some usage scenarios, data loss occurs to the image stream IS such that the image decoding apparatus 110 detects error. The condition that the image decoding apparatus 110 detects an error in the N-th image frame $FM_N$ among the N−1-th image frame $FM_{N-1}$, the N-th image frame $FM_N$, . . . and the N+P-th image frame $FM_{N+P}$ in the image stream IS is used as an example to describe the processing of the image decoding apparatus 110 in the following paragraphs.

Figure 2A:
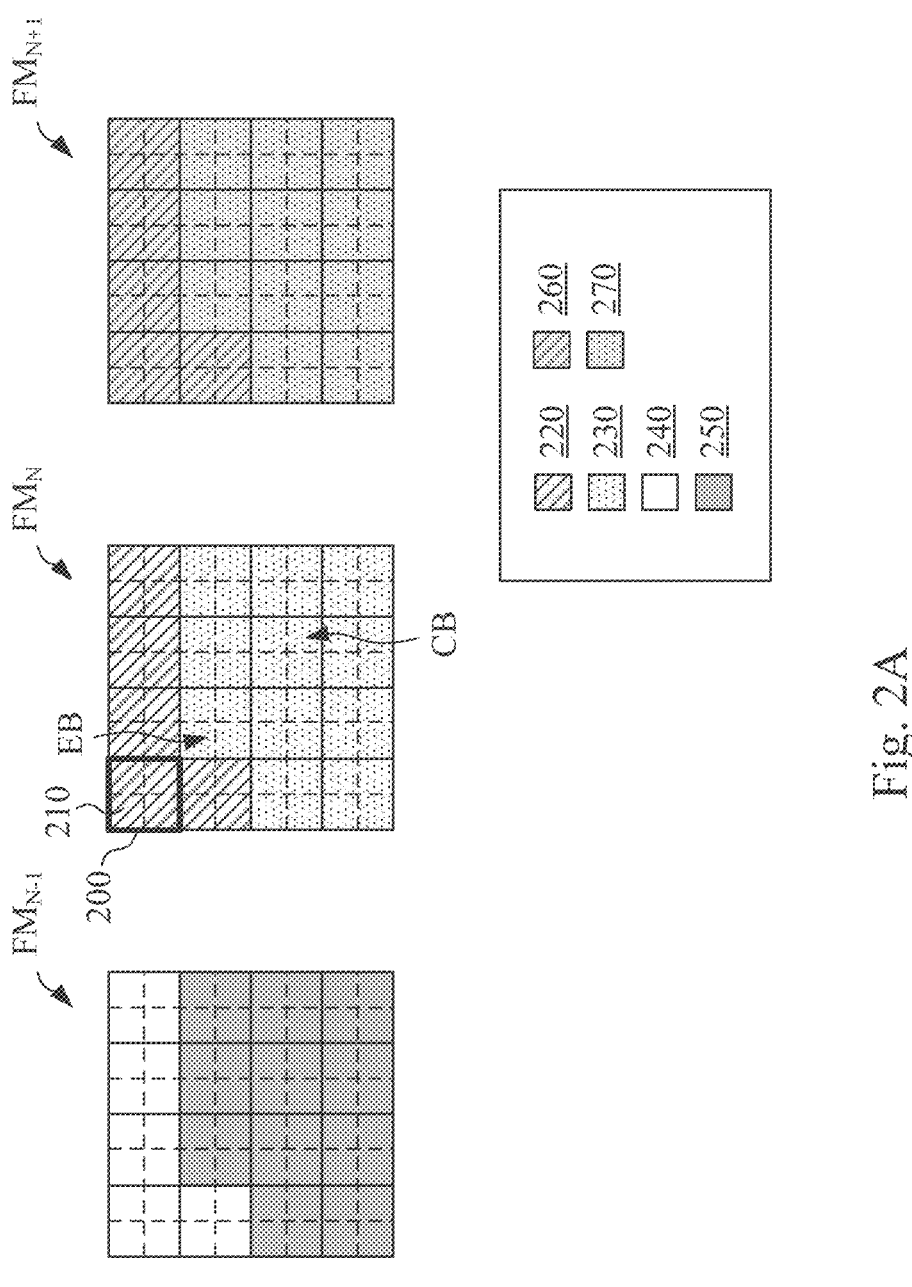
FIG. 2A illustrates a plurality of image frames in the image stream according to an embodiment of the present invention.

Reference is now made to FIG. 2A. FIG. 2A illustrates a plurality of image frames in the image stream IS according to an embodiment of the present invention. More specifically, in FIG. 2A, the N−1-th image frame $FM_{N-1}$, the N-th image frame $FM_N$ and the N+1-th image frame $FM_{N+1}$ in the image stream IS are illustrated.

In an embodiment, each of the image frames in the image stream IS may include a plurality of image processing blocks, e.g., the image processing blocks separated with each other with solid lines included in the N-th image frame $FM_N$. Each of these image processing blocks has a size for the front-end decoding circuit 120 to read and process, e.g., 32×32. In FIG. 2A, only one image processing block 200 is exemplarily labeled. Each of the image processing blocks includes a plurality of encoding unit blocks separated with each other with dashed lines. Each of these encoding unit blocks has a size for the image encoding apparatus 100 to perform a single time of encoding, e.g., 16×16. In FIG. 2A, only one encoding unit block 210 in the image processing block 200 is exemplarily labeled. It is appreciated that the size of the image processing blocks, the size of the encoding unit blocks and the number of the encoding unit blocks included in each of the image processing blocks are merely an example. The present invention is not limited thereto.

The front-end decoding circuit 120 determines an occurrence of an error block EB in the N-th image frame $FM_N$ generated according to the inter-frame coding technology in the image stream IS from the image encoding apparatus 100. In an embodiment, the front-end decoding circuit 120 performs determination based on the size corresponding to the encoding unit block. As a result, the error block EB has the same size of the encoding unit block.

Once the front-end decoding circuit 120 determines the occurrence of the error block EB, the front-end decoding circuit 120 transmits the error report information ER to the image encoding apparatus 100, such that the image encoding apparatus 100 receives the error report information ER at a time spot that the image decoding apparatus 110 receives a corresponding block CB of an N+P−1-th image frame $FM_{N+P-1}$. In the present embodiment, P is 1. In other words, in FIG. 2A, the corresponding block CB is in the N-th image frame $FM_N$.

The image encoding apparatus 100 treats the N+P-th image frame $FM_{N+P}$ (which is the N+1-th image frame $FM_{N+1}$ in the present embodiment) as a new slice, so as to encode the N+P-th image frame $FM_{N+P}$ (which is the N+1-th image frame $FM_{N+1}$ in the present embodiment) in the image stream IS according to the intra-frame coding technology.

The front-end decoding circuit 120 retrieves the motion vector information MV and the residue information RES corresponding to a plurality of the first blocks 220 in the N-th image frame $FM_N$ before the occurrence of the error block EB from the image stream IS. In FIG. 2A, the first blocks 220 before the occurrence of the error block EB are illustrated as blocks having slashes.

The back-end decoding circuit 130 performs the decoding process on the first blocks 200 according to the inter-frame coding technology to generate the first decoded result DR1.

More specifically, for the N-th image frame $FM_N$, the back-end decoding circuit 130 retrieves the previous decoded image frame (e.g., receiving the decoded image frame $FD_{N-1}$ fed from the deblock operation circuit 160 by the estimation circuit 140) as the reference image data RD to perform the decoding process on the first blocks 220 according to the inter-frame coding technology. The estimation circuit 140 performs calculation according to the reference image data RD and the motion vector information MV in the decoding process according to the inter-frame coding technology to generate the estimated pixels EP. The image reconstruction circuit 150 performs calculation according to the estimated pixels EP and the residue information RES in the decoding process to generate the reconstructed pixels RP. The deblock operation circuit 160 performs deblock operation according to the reconstructed pixels RP in the decoding process to generate the first decoded result DR1.

On the other hand, the front-end decoding circuit 120 sets the motion vector information MV to be a zero vector and sets the residue information RES to be a zero value.

The back-end decoding circuit 130 performs the decoding process on a plurality of second blocks 230 from the error block EB to a final block of the N+P−1-th image frame (which is the N-th image frame $FM_N$ in the present embodiment) according to the inter-frame coding technology to generate the second decoded result DR2. In FIG. 2A, the second blocks 230 from the error block EB to the final block of the N-th image frame $FM_N$ are illustrated as dotted blocks.

More specifically, the back-end decoding circuit 130 still uses the previous decoded image frame $FD_{N-1}$ corresponding to the N−1-th image frame $FM_{N-1}$ as the reference image data RD to perform the decoding process on the second blocks 230, such that the estimation circuit 140 performs calculation according to the reference image data RD and the motion vector information MV set to be the zero vector in the decoding process to generate the estimated pixels EP. The image reconstruction circuit 150 performs calculation according to the estimated pixels EP and the residue information RES set to be the zero value in the decoding process to generate the reconstructed pixels RP. The deblock operation circuit 160 performs deblock operation according to the reconstructed pixels RP in the decoding process to generate the second decoded result DR2. Since the motion vector information MV is the zero vector and the residue information RES is the zero value, the second decoded result DR2 is equivalent to a duplication of the content of the reference image data RD.

The back-end decoding circuit 130 outputs the first decoded result DR1 and the second decoded result DR2 to be the N-th decoded image frame $FD_N$. More specifically, after generating the first decoded result DR1 and the second decoded result DR2, the deblock operation circuit 160 of the back-end decoding circuit 130 merges the first decoded result DR1 and the second decoded result DR2 to be outputted as the N-th decoded image frame $FD_N$.

As a result, for the present embodiment, the first blocks 220 in the N-th image frame $FM_N$ are generated by referring to the blocks 240 in the N−1-th image frame $FM_{N-1}$ to further perform calculation thereon according to the motion vector information MV and the residue information RES transmitted by the image encoding apparatus 100. In FIG. 2A, the blocks 240 are illustrated as blanked blocks. On the other hand, the second blocks 230 in the N-th image frame $FM_N$ are generated by duplicating the blocks 250 in the N−1-th image frame $FM_{N-1}$. In FIG. 2A, the blocks 250 are illustrated as gray blocks.

In the present embodiment, the N+P-th image frame $FM_{N+P}$ (which is the N+1-th image frame $FM_{N+1}$ in the present embodiment) includes a plurality of inter-frame coding blocks 260 and a plurality of intra-frame coding blocks 270. The inter-frame coding blocks 260 correspond to the first blocks 220 in the N-th image frame $FM_N$. In FIG. 2A, the inter-frame coding blocks 260 are illustrated as gray blocks having slashes.

The intra-frame coding blocks 270 correspond to a plurality of other blocks besides the first blocks 220 in the N-th image frame $FM_N$, and these other blocks are the second blocks 230 in the N-th image frame $FM_N$ in the present embodiment. In FIG. 2A, the intra-frame coding blocks 270 are illustrated as gray dotted blocks.

The front-end decoding circuit 120 retrieves the motion vector information MV and the residue information RES corresponding to the inter-frame coding blocks 260 in the N+1-th image frame $FM_{N+1}$ from the image stream IS and retrieves the residue information RES corresponding to the intra-frame coding blocks 270 in the N+1-th image frame $FM_{N+1}$ from the image stream IS.

The back-end decoding circuit 130 performs the decoding process on the inter-frame coding blocks 260 according to the inter-frame coding technology to generate an inter-frame decoded result ITE, and performs the decoding process on the intra-frame coding blocks 270 according to the intra-frame coding technology to generate an intra-frame decoded result ITR.

More specifically, since the decoded result of the first blocks 220 in the N-th image frame $FM_N$ uses the blocks 240 in the N−1-th image frame $FM_{N-1}$ as the reference and is generated by the decoding process that retrieves the actual motion vector information MV and the actual residue information RES, the decoded result of the first blocks 220 are still valid to be referred to. As a result, the back-end decoding circuit 130 retrieves the previous decoded image frame as the reference image data RD to perform the decoding process on the inter-frame coding blocks 260 according to the inter-frame coding technology. The previous decoded image frame corresponds to the previous one image frame, i.e., the decoded image frame of the N-th image frame $FM_N$. The estimation circuit 140, the image reconstruction circuit 150 and the deblock operation circuit 160 perform decoding process in a sequential manner to generate the inter-frame decoded result ITE.

On the other hand, since the decoded result of the second blocks 230 in the N-th image frame $FM_N$ is equivalent to the duplication of the blocks 250 in the N−1-th image frame $FM_N$, the decoded result of the second blocks 230 are not valid to be referred to. As a result, the back-end decoding circuit 130 sets the decoded part of the N+1-th image frame (e.g., receiving the reconstructed pixels RP fed by the image reconstruction circuit 150 by the estimation circuit 140) to be the reference image data RD to perform the decoding process according to the intra-frame coding technology. The estimation circuit 140, the image reconstruction circuit 150 and the deblock operation circuit 160 perform decoding process in a sequential manner to generate the intra-frame decoded result ITR.

The back-end decoding circuit 130 further outputs the inter-frame decoded result ITE and the intra-frame decoded result ITR to be the N+1-th decoded image frame $FD_{N+1}$. More specifically, after generating the inter-frame decoded result ITE and the intra-frame decoded result ITR, the deblock operation circuit 160 of the back-end decoding circuit 130 merges the inter-frame decoded result ITE and the intra-frame decoded result ITR to be outputted as the N+1-th decoded image frame $FD_{N+1}$.

Figure 2B:
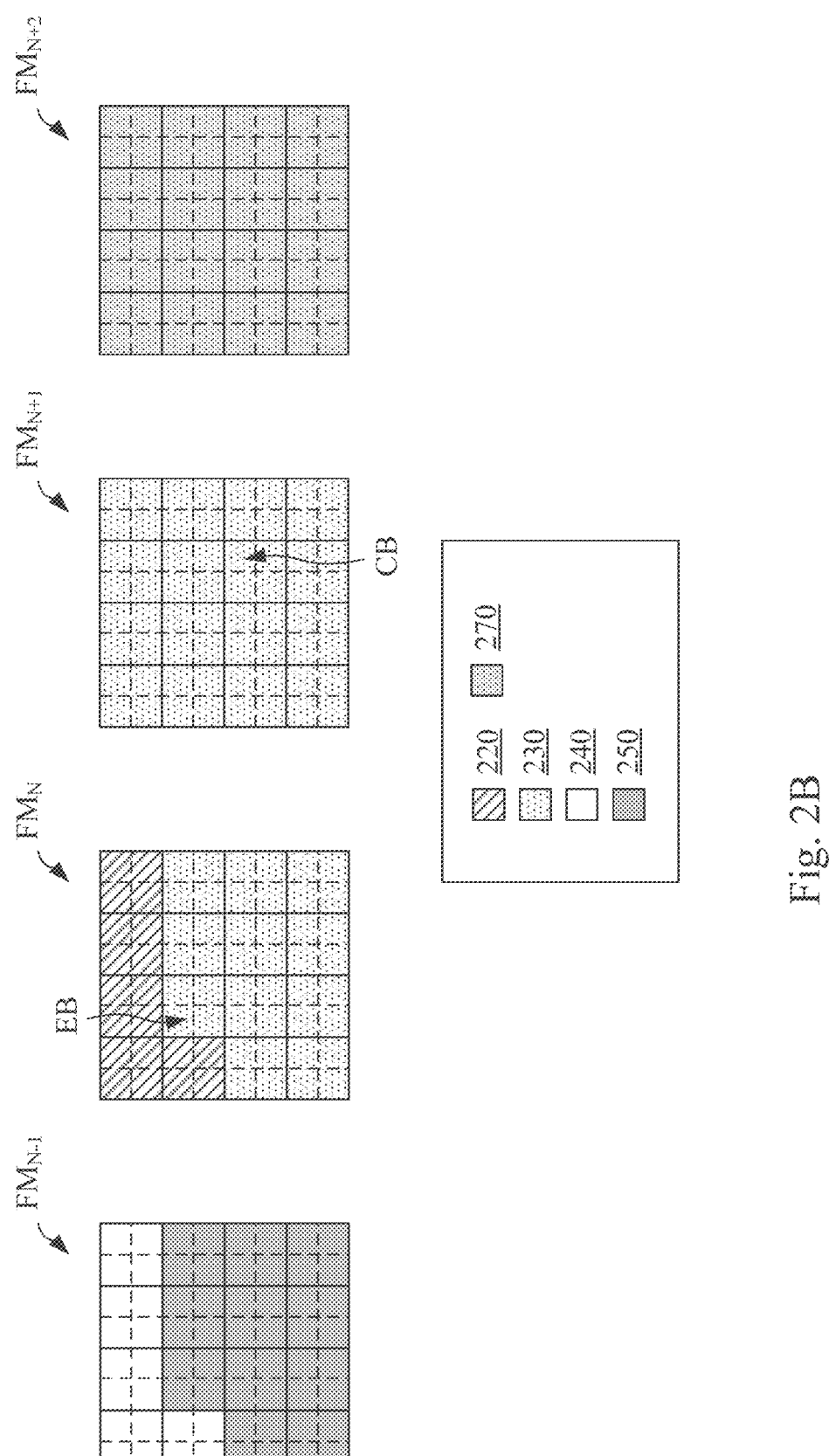
FIG. 2B illustrates a plurality of image frames in the image stream according to an embodiment of the present invention.

FIG. 2B illustrates a plurality of image frames in the image stream IS according to an embodiment of the present invention. More specifically, in FIG. 2B, the N−1-th image frame $FM_{N-1}$, the N-th image frame $FM_N$, the N+1-th image frame $FM_{N+1}$ and the N+2-th image frame $FM_{N+2}$ in the image stream IS are illustrated.

The content included by these image frames, e.g., the image processing blocks and the encoding unit blocks included by the image processing blocks are the same as those in FIG. 2A. The detail is not described herein.

Similar to the operation corresponding to FIG. 2A, the front-end decoding circuit 120 determines the occurrence of the error block EB in the N-th image frame $FM_N$ and transmits the error report information ER to the image encoding apparatus 100, such that the image encoding apparatus 100 receives the error report information ER at the time spot that the image decoding apparatus 110 receives the corresponding block CB of the N+P−1-th image frame $FM_{N+P-1}$ in the image stream. In the present embodiment, P is larger than 1. In FIG. 2B, the condition that P is 2 is illustrated to describe the operation. In other words, in FIG. 2B, the corresponding block CB resides in the N+1-th image frame $FM_{N+1}$.

The image encoding apparatus 100 treats the N+P-th image frame $FM_{N+P}$ (which is the N+2-th image frame $FM_{N+2}$ in the present embodiment) as the new slice, so as to encode the N+P-th image frame $FM_{N+P}$ in the image stream IS according to the intra-frame coding technology.

The processing of the first blocks 220 before the occurrence of the error block EB in the N-th image frame $FM_N$ performed by the front-end decoding circuit 120 and the back-end decoding circuit 130 is the same as that described along with FIG. 2A such that the first decoded result DR1 is generated by the back-end decoding circuit 130. The detail is not described herein.

On the other hand, the front-end decoding circuit 120 sets the motion vector information MV to be the zero vector and sets the residue information RES to be the zero value.

The back-end decoding circuit 130 performs the decoding process on the second blocks 230 from the error block EB to a final block of the N+P−1-th image frame $FM_{N+P-1}$ (which is the N+1-th image frame $FM_{N+1}$ in the present embodiment) in the image stream IS according to the intra-frame coding technology to generate the second decoded result DR2. In FIG. 2B, the second blocks 230 from the error block EB to the final block of the N+1-th image frame $FM_{N+1}$ are illustrated as dotted blocks.

More specifically, the back-end decoding circuit 130 uses the previous decoded image frame $FD_{N-1}$ corresponding to the N−1-th image frame $FM_{N-1}$ as the reference image data RD to perform the decoding process on the second blocks 230 corresponding to the N-th image frame $FM_N$ such that the estimation circuit 140, the image reconstruction circuit 150 and the deblock operation circuit 160 perform decoding process in a sequential manner to generate a first part of the second decoded result DR2.

The back-end decoding circuit 130 outputs the first decoded result DR1 and the first part of the second decoded result DR2 to be the N-th decoded image frame $FD_N$. More specifically, after generating the first decoded result DR1 and the first part of the second decoded result DR2, the deblock operation circuit 160 of the back-end decoding circuit 130 merges the first decoded result DR1 and the first part of the second decoded result DR2 to be outputted as the N-th decoded image frame $FD_N$.

Further, the back-end decoding circuit 130 uses the previous decoded image frame $FD_N$ corresponding to the N-th image frame $FM_N$ as the reference image data RD to perform the decoding process on the second blocks 230 corresponding to the N+1-th image frame $FM_{N+1}$ such that the estimation circuit 140, the image reconstruction circuit 150 and the deblock operation circuit 160 perform decoding process in a sequential manner to generate a second part of the second decoded result DR2.

The back-end decoding circuit 130 outputs the second part of the second decoded result DR2 to be the N+1-th decoded image frame $FD_{N+1}$. More specifically, after generating the second part of the second decoded result DR2, the deblock operation circuit 160 of the back-end decoding circuit 130 outputs the second part of the second decoded result DR2 to be the N+1-th decoded image frame $FD_{N+1}$.

Since the motion vector information MV is the zero vector and the residue information RES is the zero value, the first part of the second decoded result DR2 (i.e., the part of the N-th decoded image frame $FD_N$ corresponding to the second blocks 230) is equivalent to a duplication of the content in the reference image data RD, which is the part of the N−1-th decoded image frame $FD_{N-1}$ corresponding to the blocks 250. The second part of the second decoded result DR2 (i.e., the N+1-th decoded image frame $FD_{N+1}$) is equivalent to a duplication of the content in the reference image data RD, which is the N-th decoded image frame $FD_N$.

It is appreciated that, when P is any integer larger than 2, the deblock operation circuit 160 of the back-end decoding circuit 130 can output the second part of the second decoded result DR2 to be the N+1-th decoded image frame to the N+P−1-th decoded image frame. Further, when P is any integer larger than 2, the contents in the N+1-th decoded image frame to the N+P−1-th decoded image frame are duplications of each other.

In the present embodiment, the N+P-th image frame $FM_{N+P}$ (which is the N+2-th image frame $FM_{N+2}$ in the present embodiment) only includes the intra-frame coding blocks 270. The front-end decoding circuit 120 retrieves the residue information RES corresponding to the intra-frame coding blocks 270 in the N+2-th image frame $FM_{N+2}$ from the image stream IS. The back-end decoding circuit 130 performs the decoding process on the intra-frame coding blocks 270 according to the intra-frame coding technology to generate the intra-frame decoded result ITR. In FIG. 2B, the intra-frame coding blocks 270 are illustrated as gray dotted blocks.

More specifically, the back-end decoding circuit 130 sets the decoded part (e.g., receiving the reconstructed pixels RP fed by the image reconstruction circuit 150 by the estimation circuit 140) to be the reference image data RD to perform the decoding process according to the intra-frame coding technology. The estimation circuit 140, the image reconstruction circuit 150 and the deblock operation circuit 160 perform decoding process in a sequential manner to generate the intra-frame decoded result ITR.

The back-end decoding circuit 130 further outputs the intra-frame decoded result ITR to be the N+P-th decoded image frame $FD_{N+P}$ (which is the N+2-th decoded image frame $FD_{N+2}$ in the present embodiment). More specifically, after generating the intra-frame decoded result ITR, the deblock operation circuit 160 of the back-end decoding circuit 130 outputs the intra-frame decoded result ITR to be the N+2-th decoded image frame $FD_{N+2}$.

In an embodiment, in the two embodiments described above, the image encoding apparatus 100 may determine that no error block is presented in the N+P-th image frame $FM_{N+2}$ when no error report information related to the N+P-th image frame $FM_{N+2}$ is received from the image decoding apparatus 110. Subsequently, the image encoding apparatus 100 starts to perform the encoding process on the next image frame (e.g., the N+P+1-th image frame) according to the inter-frame coding technology such that the image decoding apparatus 110 performs the decoding process by retrieving the corresponding motion vector information and the corresponding residue information according to the inter-frame coding technology. However, the present invention is not limited thereto.

In some approaches, when the condition of data loss in the image stream received by the image decoding apparatus happens, the image decoding apparatus can not retrieve the motion vector information and the residue information of the image frames such that the decoded image frame can not be generated correctly.

The image decoding apparatus sets motion vector information to be a zero vector and sets residue information to be a zero value under the condition that an error block occurs in the N-th image frame, so as to perform decoding on image blocks from the error block to a final block of an N+P−1-th image frame that a corresponding block corresponding to a time spot that the image encoding apparatus receives error report information resides, and further perform decoding on intra-frame coding blocks of an N+P-th image frame according to an intra-frame coding technology. Such a technology allows the proceeding of the decoding process without referring to the image data having errors and increases the validity of the decoded image frame.

Reference is now made to FIG. 3. FIG. 3 illustrates a flow chart of an image decoding method 300 according to an embodiment of the present invention.

In addition to the apparatus described above, the present disclosure further provides the image decoding method 300 that can be used in such as, but not limited to, the image decoding apparatus 110 in FIG. 1. As illustrated in FIG. 3, an embodiment of the image decoding method 300 includes the following steps.

In step S310, the occurrence of the error block EB in the N-th image frame $FM_N$ generated according to the inter-frame coding technology in the image stream IS from the image encoding apparatus 100 is determined, wherein N is an integer larger than 1.

In step S320, the error report information ER is transmitted to the image encoding apparatus 100 such that the image encoding apparatus 100 receives the error report information ER at the time spot that the image decoding apparatus 110 receives the corresponding block CB of the N+P−1-th image frame $FM_{N+P-1}$ and encodes the N+P-th image frame $FM_{N+P}$ in the image stream IS according to the intra-frame coding technology, wherein P is an integer larger than or equal to 1.

In step S330, the motion vector information MV and the residue information RES corresponding to the first blocks 220 in the N-th image frame $FM_N$ before the occurrence of the error block EB are retrieved from the image stream IS, so as to perform the decoding process on the first blocks 220 according to the inter-frame coding technology to generate the first decoded result DR1.

In step S340, the motion vector information MV is set to be the zero vector and the residue information RES is set to be the zero value, so as to perform the decoding process on the second blocks 230 from the error block EB to the final block of the N+P−1-th image frame $FM_{N+P-1}$ according to the inter-frame coding technology to generate the second decoded result DR2.

In step S350, the residue information RES of the intra-frame coding blocks 270 in the N+P-th image frame $FM_{N+P}$ is retrieved from the image stream IS to perform the decoding process on the intra-frame coding blocks 270 according to the intra-frame coding technology to generate the intra-frame decoded result ITR.

It is appreciated that the embodiments described above are merely an example. In other embodiments, it should be appreciated that many modifications and changes may be made by those of ordinary skill in the art without departing, from the spirit of the disclosure.

In summary, the present invention discloses the image decoding apparatus and the image decoding method that set motion vector information to be a zero vector and set residue information to be a zero value under the condition that an error block occurs in the N-th image frame, so as to perform decoding on image blocks from the error block to a final block of an N+P−1-th image frame that a corresponding block corresponding to a time spot that the image encoding apparatus receives error report information resides, and further perform decoding on intra-frame coding blocks of an N+P-th image frame according to an intra-frame coding technology. Such a technology allows the proceeding of the decoding process without referring to the image data having errors and increases the validity of the decoded image frame.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An image decoding method used in an image decoding apparatus comprising:

determining an occurrence of an error block in an N-th image frame generated according to an inter-frame coding technology in an image stream from an image encoding apparatus, wherein N is an integer larger than 1;

transmitting error report information to the image encoding apparatus such that the image encoding apparatus receives the error report information at a time spot that the image decoding apparatus receives a corresponding block of an N+P−1-th image frame and encodes an N+P-th image frame in the image stream according to an intra-frame coding technology, wherein P is an integer larger than or equal to 1;

retrieving motion vector information and residue information corresponding to a plurality of first blocks in the N-th image frame before the occurrence of the error block from the image stream, so as to perform a decoding process on the first blocks according to the inter-frame coding technology to generate a first decoded result;

setting the motion vector information to be a zero vector and setting the residue information to be a zero value, so as to perform the decoding process on a plurality of second blocks from the error block to a final block of the N+P−1-th image frame according to the inter-frame coding technology to generate a second decoded result; and retrieving the residue information of a plurality of intra-frame coding blocks in the N+P-th image frame from the image stream to perform the decoding process on the intra-frame coding blocks according to the intra-frame coding technology to generate an intra-frame decoded result.

2. The image decoding method of claim 1, wherein P is 1, the N+P-th image frame comprises a plurality of inter-frame coding blocks and the intra-frame coding blocks, the inter-frame coding blocks correspond to the first blocks in the N-th image frame and the intra-frame coding blocks correspond to a plurality of other blocks in the N-th image frame besides the first blocks, the image decoding method further comprising:

outputting the first decoded result and the second decoded result to be an N-th decoded image frame; and retrieving the motion vector information and the residue information corresponding to the inter-frame coding blocks of the N+P-th image frame from the image stream, so as to perform the decoding process on the inter-frame coding blocks according to the inter-frame coding technology to generate an inter-frame decoded result and output the inter-frame decoded result and the intra-frame decoded result to be an N+1-th decoded image frame.

3. The image decoding method of claim 1, wherein P is larger than 1 and the N+P-th image frame only comprises the intra-frame coding blocks, the image decoding method further comprising:

outputting the first decoded result and a first part of the second decoded result to be an N-th decoded image frame;

outputting a second part of the second decoded result to be an N+1-th decoded image frame to an N+P−1-th decoded image frame; and outputting the intra-frame decoded result to be an N+P-th decoded image frame.

4. The image decoding method of claim 1, further comprising:

retrieving a previous decoded image frame to be reference image data according to the inter-frame coding technology to perform the decoding process; and setting a decoded part of the N+P-th image frame to be the reference image data according to the intra-frame coding technology to perform the decoding process.

5. The image decoding method of claim 4, further comprising:

performing calculation according to the reference image data and the motion vector information in the decoding process according to the inter-frame coding technology to generate a plurality of estimated pixels;

performing calculation according to the estimated pixels and the residue information in the decoding process to generate a plurality of reconstructed pixels; and performing deblock operation according to the reconstructed pixels in the decoding process to generate the first decoded result corresponding to the first blocks and generate the second decoded result corresponding to the second blocks.

6. The image decoding method of claim 4, further comprising:

performing calculation according to the reference image data in the decoding process according to the intra-frame coding technology to generate a plurality of estimated pixels;

performing calculation according to the estimated pixels and the residue information in the decoding process to generate a plurality of reconstructed pixels; and performing deblock operation according to the reconstructed pixels in the decoding process to generate the intra-frame decoded result corresponding to the intra-frame coding blocks.

7. An image decoding apparatus comprising:

a front-end decoding circuit configured to:

determine an occurrence of an error block in an N-th image frame generated according to an inter-frame coding technology in an image stream from an image encoding apparatus, wherein N is an integer larger than 1; and transmit error report information to the image encoding apparatus such that the image encoding apparatus receives the error report information at a time spot that the image decoding apparatus receives a corresponding block of an N+P−1-th image frame and encodes an N+P-th image frame in the image stream according to an intra-frame coding technology, wherein P is an integer larger than or equal to 1; and a back-end decoding circuit configured to:

retrieve motion vector information and residue information corresponding to a plurality of first blocks in the N-th image frame before the occurrence of the error block from the image stream, so as to perform a decoding process on the first blocks according to the inter-frame coding technology to generate a first decoded result;

set the motion vector information to be a zero vector and set the residue information to be a zero value, so as to perform the decoding process on a plurality of second blocks from the error block to a final block of the N+P−1-th image frame according to the inter-frame coding technology to generate a second decoded result; and retrieve the residue information of a plurality of intra-frame coding blocks in the N+P-th image frame from the image stream through the front-end decoding circuit to perform the decoding process on the intra-frame coding blocks according to the intra-frame coding technology to generate an intra-frame decoded result.

8. The image decoding apparatus of claim 7, wherein P is 1, the N+P-th image frame comprises a plurality of inter-frame coding blocks and the intra-frame coding blocks, the inter-frame coding blocks correspond to the first blocks in the N-th image frame and the intra-frame coding blocks correspond to a plurality of other blocks in the N-th image frame besides the first blocks;

the back-end decoding circuit is configured to output the first decoded result and the second decoded result to be an N-th decoded image frame; and the front-end decoding circuit is configured to retrieve the motion vector information and the residue information corresponding to the inter-frame coding blocks of the N+P-th image frame from the image stream, such that the back-end decoding circuit performs the decoding process on the inter-frame coding blocks according to the inter-frame coding technology to generate an inter-frame decoded result and output the inter-frame decoded result and the intra-frame decoded result to be an N+1-th decoded image frame.

9. The image decoding apparatus of claim 7, wherein P is larger than 1 and the N+P-th image frame only comprises the intra-frame coding blocks, the back-end decoding circuit is further configured to:

output the first decoded result and a first part of the second decoded result to be an N-th decoded image frame;

output a second part of the second decoded result to be an N+1-th decoded image frame to an N+P−1-th decoded image frame; and output the intra-frame decoded result to be an N+P-th decoded image frame.

10. The image decoding apparatus of claim 7, wherein the back-end decoding circuit is configured to:

retrieve a previous decoded image frame to be reference image data according to the inter-frame coding technology to perform the decoding process; and set a decoded part of the N+P-th image frame to be the reference image data according to the intra-frame coding technology to perform the decoding process.

11. The image decoding apparatus of claim 10, wherein the back-end decoding circuit comprises:

an estimation circuit configured to perform calculation according to the reference image data and the motion vector information in the decoding process according to the inter-frame coding technology to generate a plurality of estimated pixels;

an image reconstruction circuit configured to perform calculation according to the estimated pixels and the residue information in the decoding process to generate a plurality of reconstructed pixels; and a deblock operation circuit configured to perform deblock operation according to the reconstructed pixels in the decoding process to generate the first decoded result corresponding to the first blocks and generate the second decoded result corresponding to the second blocks.

12. The image decoding apparatus of claim 10, wherein the back-end decoding circuit comprises:

an estimation circuit configured to perform calculation according to the reference image data in the decoding process according to the intra-frame coding technology to generate a plurality of estimated pixels;

an image reconstruction circuit configured to perform calculation according to the estimated pixels and the residue information in the decoding process to generate a plurality of reconstructed pixels; and a deblock operation circuit configured to perform deblock operation according to the reconstructed pixels in the decoding process to generate the intra-frame decoded result corresponding to the intra-frame coding blocks.

* * * * *